United States Patent
Leermakers

(10) Patent No.: US 6,629,284 B1
(45) Date of Patent: Sep. 30, 2003

(54) SYSTEM AND METHOD FOR SUPERVISED DOWNLOADING OF BROADCAST DATA

(75) Inventor: Rene Leermakers, Shomron (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/428,767

(22) Filed: Oct. 28, 1999

(51) Int. Cl.⁷ .............................. G08C 25/02; H04L 1/18
(52) U.S. Cl. ...................................................... 714/748
(58) Field of Search ................................. 714/748, 752

(56) References Cited

U.S. PATENT DOCUMENTS

| | | | | |
|---|---|---|---|---|
| 4,939,731 A | * | 7/1990 | Reed et al. ................. | 714/748 |
| 5,036,518 A | * | 7/1991 | Tseung ........................ | 714/748 |
| 5,517,508 A | * | 5/1996 | Scott ........................... | 714/776 |
| 5,553,083 A | * | 9/1996 | Miller ......................... | 714/748 |
| 5,594,490 A | | 1/1997 | Dawson et al. .............. | 348/6 |
| 5,689,439 A | * | 11/1997 | Weerackody et al. ....... | 370/329 |
| 5,701,427 A | * | 12/1997 | Lathrop ...................... | 709/237 |
| 5,717,452 A | | 2/1998 | Janin et al. .................... | 348/7 |
| 5,727,002 A | * | 3/1998 | Miller et al. ................ | 714/748 |
| 5,832,287 A | * | 11/1998 | Atalla ......................... | 709/231 |
| 5,848,378 A | | 12/1998 | Shelton et al. ................ | 702/3 |
| 5,886,991 A | | 3/1999 | Guarneri et al. ............ | 370/389 |
| 6,006,351 A | * | 12/1999 | Peretz et al. ................ | 714/751 |
| 6,021,124 A | * | 2/2000 | Haartsen ..................... | 370/336 |
| 6,052,812 A | | 4/2000 | Chen et al. .................. | 714/751 |
| 6,126,310 A | * | 10/2000 | Osthoff et al. .............. | 714/751 |
| 6,154,637 A | * | 11/2000 | Wright et al. ................. | 455/66 |
| 6,175,738 B1 | * | 1/2001 | Flake et al. .................. | 455/451 |
| 6,208,839 B1 | * | 3/2001 | Davani ........................ | 340/7.2 |
| 6,236,647 B1 | * | 5/2001 | Amalfitano ................. | 370/335 |
| 6,246,693 B1 | * | 6/2001 | Davidson et al. ........... | 370/445 |
| 6,373,842 B1 | * | 4/2002 | Coverdale et al. .......... | 370/394 |

FOREIGN PATENT DOCUMENTS

| | | | | |
|---|---|---|---|---|
| EP | 0856966 | | 7/1997 | ............. H04L/1/16 |
| WO | WO 8804496 A | * | 6/1988 | ............. H04L/1/12 |
| WO | WO9905868 | | 2/1999 | ............. H04N/7/24 |

* cited by examiner

*Primary Examiner*—Phung M. Chung
*Assistant Examiner*—Joseph D. Torres
(74) *Attorney, Agent, or Firm*—Gregory L. Thorne

(57) ABSTRACT

There is disclosed a data processing system for receiving at least one of a user data file and an application program wirelessly transmitted from a central server. The data processing system comprises an RF transceiver for receiving in a forward channel blocks of data transmitted by the central server and transmitting to the central server in a reverse channel at least one of user input data and user commands. The blocks of data comprise the user data file and the application program. The data processing system further comprises a download controller for monitoring the received blocks of data and detecting therein corrupted data associated with a first block of data. The download controller, in response to the detection of the corrupted data, transmits to the central server via a wireline network a retransmission request capable of causing the central server to retransmit the first block of data.

17 Claims, 3 Drawing Sheets

SYSTEM AND METHOD FOR SUPERVISED DOWNLOADING OF BROADCAST DATA

TECHNICAL FIELD OF THE INVENTION

The present invention is directed, in general, to broadcasting systems and, more specifically, to a broadcasting network capable of downloading application software and user data rapidly and securely to a plurality of users.

BACKGROUND OF THE INVENTION

From the middle 1990s to the present, the wireless communication industry has experienced the same type of explosive growth that the personal computer (PC) industry experienced in the 1980s and early 1990s. Much of this growth was spurred by the Federal Communication Commission's ("FCC") auctioning of portions of the radio spectrum for a variety of new technologies, including high definition television (HDTV), personal communication services (PCS) systems, two-way wireless messaging, advanced cellular networks, and the like. In addition to improving traditional public broadcasting, such as radio and television programs, these new technologies have also made it possible to rapidly broadcast shared software, such as application programs and user data, to a large number of users.

The broadcast of software is a useful complement to the concept of "network computers." Network computers, sometimes called "thin clients," are PCs that contain a minimum amount of installed software and that download most data and software from a server when needed. The user is generally unaware that he or she is not working with a computer with local storage and software. This only works if the client-server connection is broad enough to instantly download the required data. Unfortunately, client PCs are typically connected to the server via a telephone line and a 28.8 kbps or 56 kbps modem.

Broadband broadcasting of common software applications provides rapid downloading of software to user devices, including client PCs and smart appliances. In a typical scenario, a user device, such as a laptop computer running a Windows™ operating system, an advanced cellular device, or a smart appliance running a Windows CE™ operating system, receives transmitted data via a broadband broadcast connection. When the user needs to execute a particular application, the user device downloads the application from the network via a designated broadband frequency in which the application is repeatedly transmitted. The user uploads data to the network via a modem connection or by a narrowband wireless connection. If the user needs personal user data from the server, the user transmits a request for the data to the server and then downloads the user data via a user-selected or a server-selected broadband frequency.

Unfortunately, the broadband connection is unreliable and if an application is corrupted during transmission, the user device must wait for the next transmission of the same application program. However, some of the data corrupted in the original broadcast may also be corrupted in the second broadcast. Hence, the user device must wait for at least a third transmission of the application program. This process may be repeated many times before the application program is finally completely downloaded. Naturally, this slows down the operation of the user device.

There is therefore a need in the art for improved systems and methods for downloading application programs and/or user data via a broadcast connection. In particular, there is a need for improved systems and methods for downloading broadcast software with minimum performance degradation if the software is corrupted during broadcast.

SUMMARY OF THE INVENTION

To address the above-discussed deficiencies of the prior art, it is a primary object of the present invention to provide a data processing system capable of receiving at least one of a user data file and an application program wirelessly transmitted from a central server, the data processing system comprising: 1) an RF transceiver capable of receiving in a forward channel blocks of data transmitted by the central server and transmitting to the central server in a reverse channel at least one of user input data and user commands, wherein the blocks of data comprise the at least one of a user data file and the application program; and 2) a download controller capable of monitoring the received blocks of data and detecting therein corrupted data associated with a first block of data, wherein the download controller, in response to the detection of the corrupted data, transmits to the central server via a wireline network a retransmission request capable of causing the central server to retransmit the first block of data.

According to an advantageous embodiment of the present invention, the central server retransmits the first block of data via the wireline network.

According to one embodiment of the present invention, the download controller is capable of detecting an omitted block of data from the received block of data.

According to another embodiment of the present invention, the download controller, in response to the detection of the omitted block of data, transmits to the central server via the wireline network a retransmission request capable of causing the central server to retransmit the omitted block of data.

According to still another embodiment of the present invention, the central server retransmits the omitted block of data via the wireline network.

According to yet another embodiment of the present invention, the central server intermittently transmits the application program in the forward channel.

According to a further embodiment of the present invention, the wireline network is a publicly switched telephone network.

According to a still further embodiment of the present invention, the wireline network is the Internet.

The foregoing has outlined rather broadly the features and technical advantages of the present invention so that those skilled in the art may better understand THE DETAILED DESCRIPTION OF THE INVENTION that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
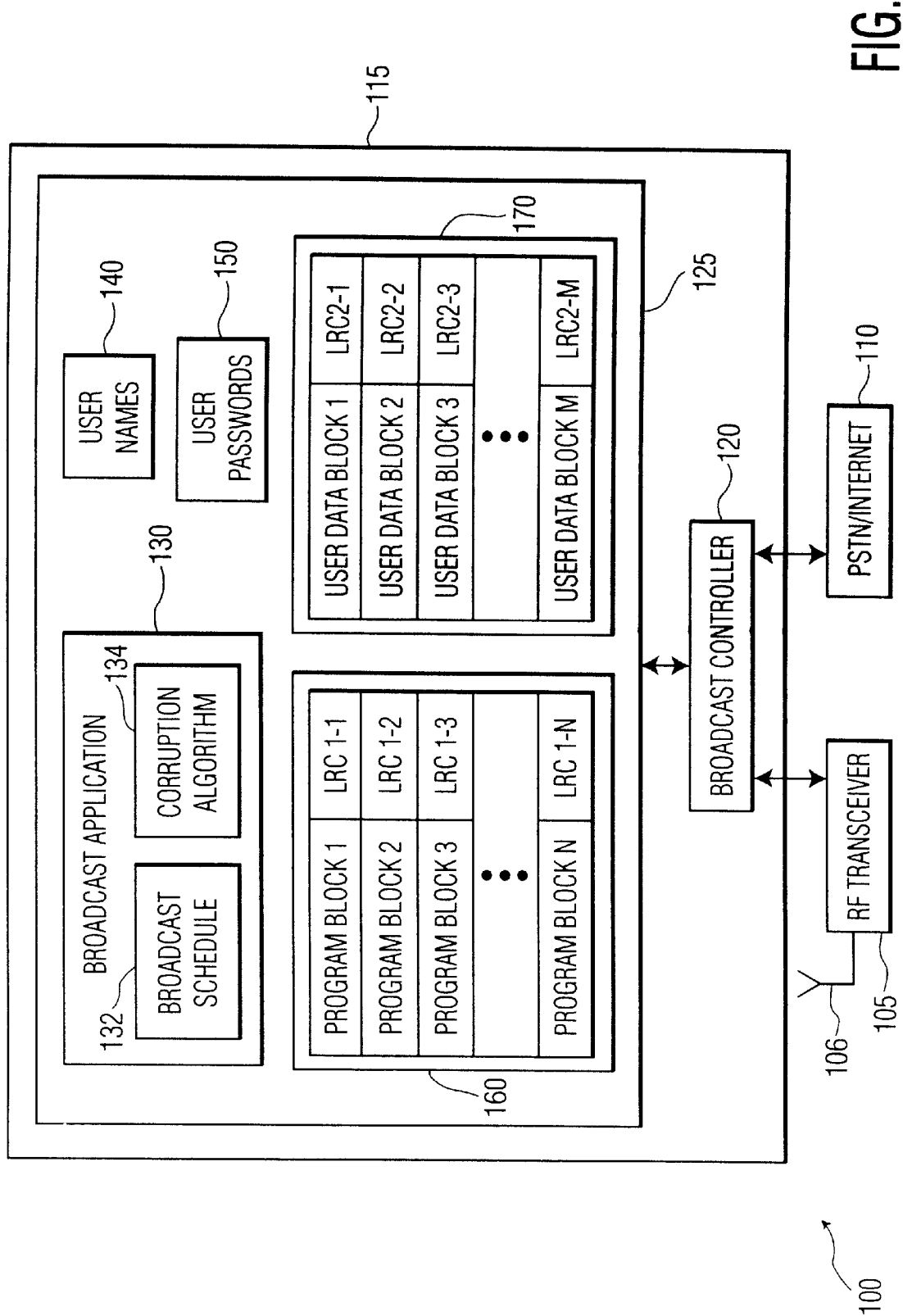
FIG. 1 illustrates an exemplary wireless server for broadcasting software in accordance with one embodiment of the present invention.
Figure 2:
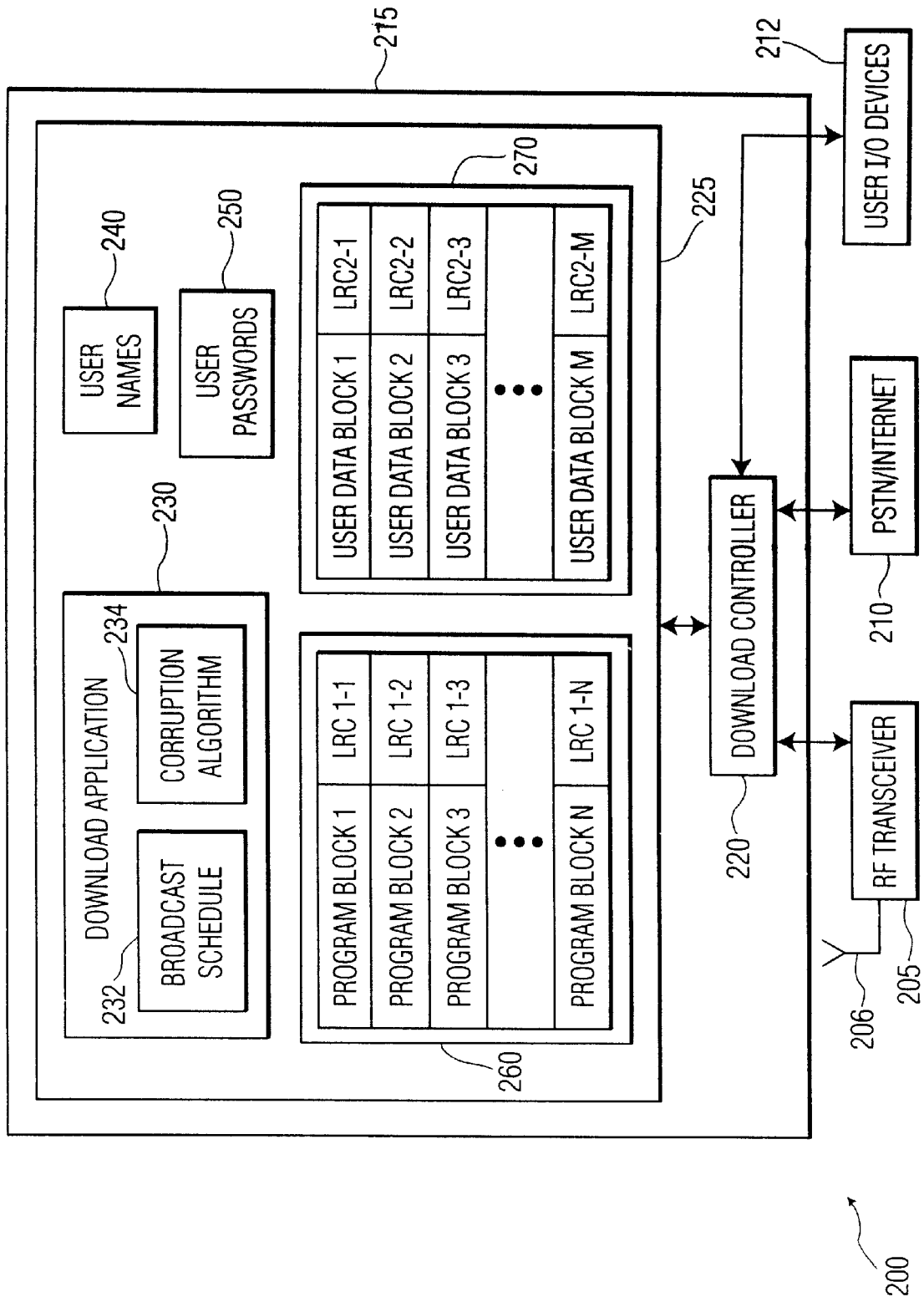
FIG. 2 illustrates an exemplary user device capable of receiving broadcast software in accordance with one embodiment of the present invention.
Figure 3:
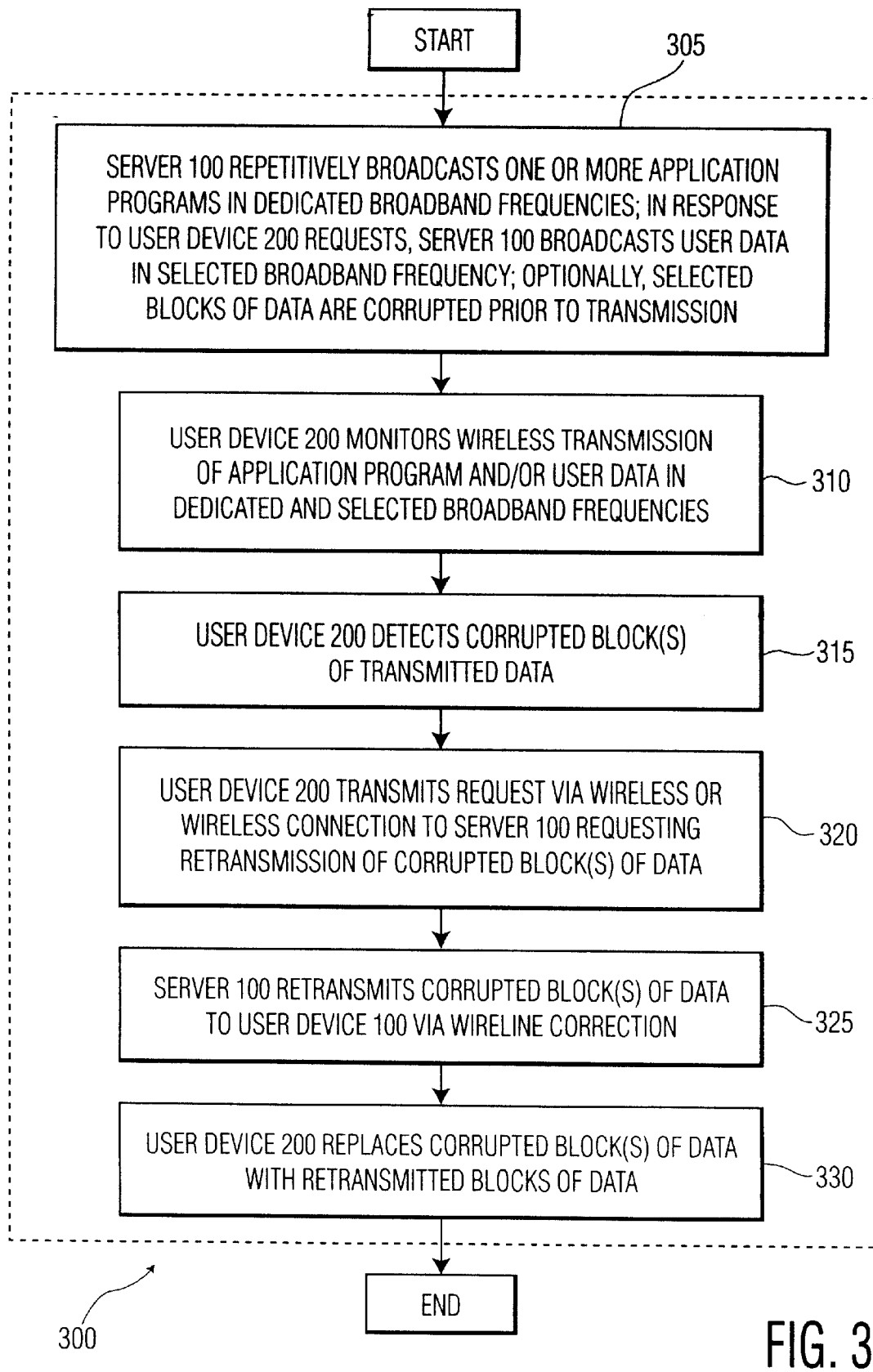
FIG. 3 is a flow chart illustrating an exemplary downloading operation of broadcast software in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged software broadcasting network.

FIG. 1 illustrates exemplary software broadcasting server 100 in accordance with one embodiment of the present invention. Server 100 comprises RF transceiver 105, antenna 106, and processing system 115. Processing system 115 further comprises broadcast controller 120 and memory 125. Broadcast controller 120, under control of broadcast application 130 in memory 125, controls the wireless transmission of application programs and user data to system subscribers via RF transceiver 105 and antenna 106. Broadcast controller 120 also receives inputs from subscribers via RF transceiver 105 and wireline network 110, which may be, for example, the public switched telephone network (PSTN) or the Internet.

Memory 125 also stores user names table 140, user passwords table 150, end-user application program 160, and user data files 170. User names table 140 provides the name of each user which is authorized to access server 100. Each user name serves as a pointer to its associated password as stored in user passwords table 150. Verification of received user names and passwords provides protection against unauthorized access to server 100 centralized application programs and services.

Exemplary end-user application program 160 is available for wireless and/or wireline access by authorized users. Data stored in end-user application program 160 is partitioned into N blocks, labeled Program Block 1 through Program Block N, each of which has associated therewith a longitudinal redundancy check (LRC) value, labeled LRC1-1 through LRC1-N. The LRC values may be calculated by any one of many well-known techniques and are dependent on the values of the data contained in each of the program blocks. For example, LRC1-1 may be a byte that is calculated by exclusive-ORing (X-OR) all of the bytes in Program Block 1. If the transmitted LRC matches the LRC calculated by the receiving user device using the received program block, the user device knows that the transmitted program block was correctly received (i.e., not corrupted). When a user device calculates an LRC that does not match the received LRC, the user device knows that the received program block data is corrupted.

Exemplary user data file 170 stores data associated with a selected authorized user. User data file 170 may include data created from application programs wirelessly downloaded to a user device, as well as data from programs resident in user devices. For instance, user data file 170 data may represent a spreadsheet file, a personal calendar file, a word processing file, a database, and the like. User data file 170 in memory 125 is partitioned into M blocks, labeled User Data Block 1 through User Data Block M, each of which has associated therewith a longitudinal redundancy check (.LRC) value, labeled LRC2-1 through LRC2-M. If the transmitted LRC matches the LRC calculated by the receiving user device using the received user data block, the user device knows that the transmitted user data block was correctly received (i.e., not corrupted). When a user device calculates an LRC that does not match the received LRC, the user device knows that the received user data block data is corrupted.

Broadcast application 130 comprises software for transmitting (i.e., broadcasting) application programs to one or more users via RF transceiver 105 and antenna 106, or wireline network 110, as described below. Broadcast application 130 also includes broadcast schedule routine 132 and corruption algorithm 134. Broadcast schedule routine 132 represents frequency assignment information and/or time-of-day data for transfer of particular application programs. For instance, end-user application program 160 may be assigned to a particular frequency channel for repetitive transmission throughout the day.

In one embodiment, broadcast schedule routine 132 may represent a sequence or sequences for cycling through a plurality of selected application programs. The sequence may address one or more elements, including frequency channels assigned on a sequence basis, time-of-day for sequencing, the timing interval between each transferred program, and the like. In another embodiment, broadcast schedule routine 132 may represent a time sequence for cycling through selected application programs, a time-of-day for a selected sequence of programs, different frequency channels for different programs, and/or different sequence of selected programs for a particular time-of-day.

Corruption algorithm 134 comprises software that periodically causes one or more out-going blocks of data from end-user application program 160 or user data file 170 to be purposely corrupted during the RF broadcast process. In accordance with the principles of the present invention, this purposeful corruption of out-going data provides the means for ensuring that application programs and user-selected data are only available to authorized users without the greater consumption of time associated with encryption and decryption processes. The corruption is detected in the receiving user device when the LRC check fails. In an alternate embodiment of the present invention, corruption algorithm 134 may simply block the transmission of (i.e., omit) a program block or user data block. The omitted user data block is detected in the receiving user device using sequence numbers associated with each program block or user data block.

Antenna 106 and RF transceiver 105 broadcast end-user application program 160 or user data file 170 and associated LRCs from broadcast controller 120 under the control of broadcast application 130. When application program 160 is initially loaded into memory 125, broadcast controller 120 partitions the program into N blocks and calculates and stores the LRC associated with each program block. Broadcast controller 120 causes RF transceiver 105 to broadcast Program Blocks 1–N to user devices in a "forward" channel indicated by broadcast schedule 132. Periodically during the broadcast of a particular program and under the direction of corruption algorithm 134, broadcast controller 120 causes one or more selected program blocks to be corrupted while the LRC associated with the block remains unchanged.

When an authorized user device receives broadcast program or user data blocks, it compares the received LRCs with LRCs calculated for the received blocks of data. When a corrupted data block is indicated by a difference in LRCs, the user device may wirelessly transmit in a "reverse" channel a "Retransmit" message containing a user name, a user password, and the identification of the corrupted block. Alternatively, the user device may send a "Retransmit" message through wireline network 110. In either case, processing system 115 verifies the received user name and associated user password using the data in user names table 140 and user passwords table 150. When processing system 115 determines that a valid user has responded, it transfers an uncorrupted version of the previously corrupted program block or user data block to the requesting user device via wireline network 110.

In an alternate embodiment, corruption algorithm 134 may cause broadcast controller 120 to purposely delete one or more program blocks or user data blocks during the transmission process. When the receiving user device detects the missing program block or user data block using the sequence numbers associated with the received blocks, the user device requests retransmission of the missing data block via a reverse channel request through the wireless network or via wireline network 110. In response, server 100 retransmits the missing data block and its associated LRC via wireline network 110.

FIG. 2 illustrates exemplary user device 200, which is capable of receiving RF broadcast software in accordance with one embodiment of the present invention. User device 200 comprises RF transceiver 205, antenna 206, and processing system 215, which may be, for example, a personal computer (PC), an advanced cellular telephone device, a personal communication services (PCS) device, a personal digital assistant (PDA) device, a PalmPilot™ device, or the like. Processing system 215 further comprises download controller 220 and memory 225. Download controller 220, under the direction of download application 230 in memory 225, controls the downloading of program blocks and user data blocks and LRCs from server 100 via RF transceiver 205 and antenna 206 and, alternatively, wireless network 110.

Download controller 220 receives data inputs and commands from a subscriber via one or more user I/O device(s) 212, which may include, for example, a keyboard, a mouse, a touch screen, or the like. Download controller 220 may transmit at least some of these subscriber inputs and/or commands to server 100 via RF transceiver 205 or via wireline network 110. Memory 225 also stores user names table 240, user passwords table 250, end-user application program 260, and user data file 270. Data stored in user names table 240 represents the name or names or authorized users or subscribers associated with user device 200. These user names serve as pointers to their respective password as stored in user passwords table 250. Multiple user names and passwords may be assigned to a user device 200 when one or more individuals have access to user device 200 and/or when one or more accounts or services are assigned to user device 200. Data in user names table 240 and user passwords table 250 corresponds to the equivalent user device 200 data as stored in server 100.

End-user application program 260 is the downloaded version of end-user application program 160 transmitted by server 100. User data file 270 provides temporary storage for data created or modified by user device 200 while running an application program processing and stores user data files received from server 100. User data file 270 may include data created by a transferred application program or by an application program resident in user device 200, which may reside in memory 225. User data may represent spreadsheets, personal calendars, word processing files, databases, and the like. Example user-resident programs may include an operating system program or programs which provide basic capability for email, Internet, and the like.

Download application program 230 comprises software that controls the wireless reception of application program blocks via a forward channel through antenna 206 and transceiver 205 and, alternatively, via wireline network 110. Download application 230 also includes broadcast schedule routine 232 and corruption algorithm 234 that provide user device 200 resident storage for the previously described broadcast schedule and corruption algorithm in server 100. In this case, download controller 220 uses broadcast schedule routine 232 to determine the frequency channel (and optionally a time slot) for downloading a particular application program.

Similarly, download controller 220 calculates an LRC for a received program data blocks based on corruption algorithm 234 and compares the calculated LRC with the received LRC. When the LRCs match, download controller 220 takes no further action. When the LRCs do not match, download controller 220 transmits a retransmission request to server 100 through the reverse channel via RF transceiver 205 and antenna 206, or via wireline network 110. The retransmission request causes server 100 to retransmit the identified application program block and its LRC via wireline network 110. In the case of user data file 270, download controller 220 calculates an LRC for each user data block received from server 100. Download controller 220 compares the calculated LRC to the received LRC and requests retransmission of blocks when mismatches are found, as previously described.

In an alternate embodiment (as described above for server 100), download controller 220 examines downloaded program blocks and user data blocks from server 100 to determine if one or more program blocks or user data blocks and missing. When download controller 220 detects that a block is missing, download controller 220 identifies and requests retransmission of the missing block in a reverse channel message via RF transceiver 205 and antenna 206, or via wireline network 110. Various methods may be used for detection of the missing block. For instance, download controller 220 may detect the presence of a forward channel data header without accompanying data, the absence of an expected sequence number, or the like.

FIG. 3 shows a flow chart 300 illustrating an exemplary downloading operation of broadcast software in accordance with one embodiment of the present invention. Server 100 repeatedly broadcasts one or more common application programs in one or more dedicated broadband frequencies. The time slots and frequencies of transmission are determined by data stored in broadcast schedule routine 132. If user device 200 requests the transfer of a specific user data file, server 100 receives the request via RF transceiver 105 or wireline network 110 and transmits the requested user data blocks and associated LRCs in a selected forward channel via RF transceiver 105. Optionally, server 100 may cause one or more application program blocks or user data blocks to be purposely corrupted (or omitted) prior to transmission (process step 305).

User device 200, under control of download application 230, monitors the wireless transmissions of server 100 in order to receive and download transmitted end-user application program 160 or user data file 170. In the case of end-user application program 160, user device 200 monitors the dedicated broadcast frequency that carries end-user application program 160. In the case of user data file 170, user device 200 monitors a selected broadband frequency specified by server 100 for the transmission of user data file 170 (process step 310).

Once a program or user data block is received, user device 200 calculates an LCR for the block according to corruption algorithm 234 and compares the calculated LCR with the associated received LCR. When user device 200 determines that received and calculated LCR(s) are different, it determines that the associated block(s) are corrupted (process step 315).

Subsequently, user device 200 transmits a request for the retransmission of identified blocks of data and the corresponding LCR(s) to server 100. User device 200 transmits the retransmission request via wireline network 110 or through RF transceiver 205 and antenna 206 (process step 320). Upon receiving the retransmission request from user device 200 and verifying the user name and user password associated with user device 200, server 100 retransmits the corrupted block(s) of data (in uncorrupted form) and associated LRCs to user device 200 through wireline network 110 (process step 325).

User device 200 receives the retransmitted block(s) of data and associated LRCs through wireline network 100. User device 200 calculates LCR(s) for the received block(s) of data and compares the calculated LCR(s) with the received LCR(s). Assuming that no corruption occurred during the wireline transfer process, user device 200 determines that the LCR(s) match and subsequently replaces the previously stored corrupted block(s) of data with the newly received uncorrupted block(s) of data (process step 330.)

The present invention provides a means for transferring selected program(s) and other blocks of user data between one or more servers associated with wireless and wireline networks and one or more authorized user devices. This invention further provides the ability for maximizing the transfer of blocks of data through wireless medium while providing added security with selected transfer via wireline media. Further, the present invention provides a secure means for downloading user data and application programs without consuming the time required for additional encryption, transfer, and decryption of protected blocks of data. The intentional corruption or omission, or both, of one or more data blocks from an application program or a user data file renders the application program or user data file unusable.

Although the present invention has been described in detail, those skilled in the art should understand that they may make numerous changes, substitutions and alterations herein without departing from the spirit and scope of the invention in its broadest form.

What is claimed is:

1. A data processing system capable of receiving at feast one of a user data file and an application program wirelessly transmitted from a central server, said data processing system comprising:
    an RF transceiver capable of contemporaneously:
        receiving in a first forward channel blocks of data transmitted by said central server
        receiving in a second forward channel other data transmitted by said central server, and
        transmitting to said central server in a reverse channel at least one of user input data and user commands,
    wherein said blocks of data comprise said at least one of a user data file and said application program; and
    a download controller capable of
        monitoring said received blocks of data and
        detecting therein corrupted data associated with a first block of data,
    wherein said download controller, in response to said detection of said corrupted data,
        transmits to said central server a retransmission request causing said central server to retransmit said first block of data as the other data in the second forward channel,
    wherein said second forward channel is a separate transmission channel from said first forward channel.

2. The data processing system set forth in claim 1 wherein said central server retransmits said first block of data via a wireline network.

3. The data processing system set forth in claim 1 wherein said download controller is capable of detecting an omitted block of data from said received block of data.

4. The data processing system set forth in claim 3 wherein said download controller, in response to said detection of said omitted block of data, transmits to said central server via a wireline network a retransmission request capable of causing said central server to retransmit said omitted block of data as the other data in the second forward channel.

5. The data processing system set forth in claim 4 wherein said central server retransmits said omitted block of data via a wireline network.

6. The data processing system set forth in claim 1 wherein said central server intermittently transmits said application program in said forward channel.

7. The data processing system set forth in claim 1 wherein said second forward channel is a publicly switched telephone network.

8. The data processing system set forth in claim 1 wherein said second forward channel is the Internet.

9. For use in a data processing system, a method of downloading at least one of a user data file and an application program from a central server, the method comprising:
    receiving in a first forward channel blocks of data wirelessly transmitted by the central server, wherein the blocks of data comprise the at least one of a user data file and the application program;

transmitting to the central server in a reverse channel at least one of user input data and user commands;

monitoring the received blocks of data and detecting therein corrupted data associated with a first block of data;

in response to the detection of the corrupted data, transmitting to the central server a retransmission request causing the central server to retransmit the first block of data via a second forward channel, wherein said second forward channel is a separate transmission channel from said first forward channel that is configured to allow cotemporaneous transmissions from the central server via the first and second forward channels.

10. The method set forth in claim 9 wherein the central server retransmits the first block of data via a wireline network.

11. The method set forth in claim 9 further including detecting an omitted block of data from the received blocks of data.

12. The method set forth in claim 11 further including in response to the detection of the omitted block of data, transmitting to the central server via a wireline network a retransmission request capable of causing the central server to retransmit the omitted block of data.

13. A data processing server capable of transmitting at least one of a user data file and an application program wirelessly, said server comprising:

an RF transceiver capable of contemporaneously:

transmitting blocks of data in a first forward channel, transmitting other data in a second forward channel and receiving in a reverse channel at least one of user input data and user commands, wherein said blocks of data comprise said at least one of a user data file and said application program; and a download controller capable of monitoring said reverse channel and detecting therein a retransmission request associated with a first block of data, wherein said download controller, in response to said detection of said retransmission request, verifies an identity of origin of said retransmission request and retransmits said first block of data necessarily as the other data in the second forward channel, wherein said second forward channel is a separate transmission channel from said first forward channel.

14. The server of claim 13 wherein said first block of data is retransmitted via a wireline network.

15. The server of claim 13 wherein said server intermittently transmits said application program in said forward channel.

16. The server of claim 13 wherein said second forward channel is a publicly switched telephone network.

17. The server of claim 13 wherein said second forward channel is the Internet.

* * * * *